(12) United States Patent
Sinha et al.

(10) Patent No.: US 11,574,266 B2
(45) Date of Patent: Feb. 7, 2023

(54) RECOMMENDER SYSTEM FOR REPLACING HUMAN INTERACTION SERVICES

(71) Applicant: Adobe Inc., San Jose, CA (US)

(72) Inventors: Atanu R. Sinha, Bangalore (IN); Ishita Sunity Kumar Chakraborty, New Haven, CT (US)

(73) Assignee: Adobe Inc., San Jose, CA (US)

( * ) Notice: Subject to any disclaimer, the term of this patent is extended or adjusted under 35 U.S.C. 154(b) by 22 days.

(21) Appl. No.: 16/986,673

(22) Filed: Aug. 6, 2020

(65) Prior Publication Data

US 2022/0044171 A1 Feb. 10, 2022

(51) Int. Cl.
*G06Q 10/06* (2012.01)

(52) U.S. Cl.
CPC ... *G06Q 10/06312* (2013.01); *G06Q 10/0637* (2013.01); *G06Q 10/06393* (2013.01)

(58) Field of Classification Search
CPC .............. G06Q 10/00; G06Q 10/06312; G06Q 10/0637; G06Q 10/06393; G06Q 50/00
See application file for complete search history.

(56) References Cited

U.S. PATENT DOCUMENTS

| 8,010,584 B1 * | 8/2011 | Craver | G06Q 10/06315 |
| | | | 707/812 |
| 2004/0230397 A1 * | 11/2004 | Chadwick | G06Q 10/10 |
| | | | 702/181 |
| 2005/0114829 A1 * | 5/2005 | Robin | G06Q 10/06 |
| | | | 717/101 |
| 2008/0027738 A1 * | 1/2008 | Friedrichowitz | G06Q 30/016 |
| | | | 705/346 |
| 2010/0138250 A1 * | 6/2010 | Brown | G06Q 10/06 |
| | | | 705/7.11 |
| 2011/0131078 A1 * | 6/2011 | Dennard | G06Q 10/067 |
| | | | 705/7.31 |
| 2013/0132288 A1 * | 5/2013 | Ng | G06Q 30/0201 |
| | | | 705/310 |

(Continued)

OTHER PUBLICATIONS

"Device Software Functions Including Mobile Medical Applications", Retrieved at: https://www.fda.gov/medical-devices/digital-health/device-software-functions-including-mobile-medical-applications—on Jun. 8, 2020, 5 pages.

(Continued)

*Primary Examiner* — Rutao Wu
*Assistant Examiner* — Stephen S Swartz
(74) *Attorney, Agent, or Firm* — FIG. 1 Patents

(57) ABSTRACT

A human interaction replacement evaluation system analyzes actions taken by a user with an application on a client device that provides features to replace human interaction services with computer-based services. The results of the action provide an indication of the success of a particular action supported by the application (e.g., whether the action has a positive or negative effect on a key performance indicator) or an indication of how likely the user is to be ready to adopt a particular computer-based service. Recommendations are then provided to the user of the application or a manager of the application indicating actions to use, actions that have negative or positive effects on a key performance indicator, and so forth.

20 Claims, 6 Drawing Sheets

(56) References Cited

U.S. PATENT DOCUMENTS

2014/0180943 A1* 6/2014 Priddy, Jr. ............ G06Q 10/105
                                                            705/319
2019/0268283 A1* 8/2019 Mukherjee ......... G06Q 30/0201
2021/0019325 A1* 1/2021 Edge ...................... H04L 51/22

OTHER PUBLICATIONS

Catmull, Jaime, "The 15 Best Investment Apps For Everyday Investors", Oct. 7, 2019, 10 pages.
Kennickell, Arthur B. et al., "Who Uses Electronic Banking? Results from the 1995 Survey of Consumer Finances", Jul. 1997, 48 pages.
Shell, Michelle A. et al., "Why Anxious Customers Prefer Human Customer Service", Retrieved at: https://hbr.org/2019/04/why-anxious-customers-prefer-human-customer-service, Apr. 15, 2019, 7 pages.

* cited by examiner

RECOMMENDER SYSTEM FOR REPLACING HUMAN INTERACTION SERVICES

BACKGROUND

As computing technology has advanced so too have the uses for computing devices. One such use is the replacement of services traditionally involving a high amount of human interaction with computer-based services. For example, a user's stay at a hotel used to include a high amount of human interaction, such as calling the hotel to speak with a person at the hotel for a reservation, checking into the hotel by speaking with a person at the front desk and receiving a room key from that person, calling a person at a concierge desk or restaurant for assistance or services during their stay, and so forth. Many of these human interactions are being replaced with computer-based services. For example, conventional systems allow a user to make a reservation using a smartphone application rather than calling the hotel or check-in to the hotel and receive a mobile electronic key using the smartphone application rather than speaking with a person at the front desk and receiving a physical key from that person.

The replacement of services traditionally involving a high amount of human interaction with computer-based services has advantages, such as saving users time, saving businesses money, and so forth. However, replacing services traditionally involving a high amount of human interaction with computer-based services is not without its problems. For example, some users do not like the lack of human interaction, some users do not know how to resolve problems with the computer-based services, some users are averse to new technology, and so forth. These problems make it difficult for companies to know which human interaction services to replace with computer-based services.

Conventional solutions for determining which human interaction services to replace with computer-based services include using surveys to seek opinions of users about their experience, interest, level of satisfaction, and so forth with the computer-based services. Such surveys, however, are problematic because they reflect what users say not what users actually do, typically have very low response rates, and respondents oftentimes have extreme views and therefore are biased. Thus, these surveys are of questionable value. This leaves companies with little, if any, accurate information on which human interaction services to replace with computer-based services, which leads to poor decision making by the companies and user dissatisfaction and frustration with the computer-based services provided by those companies.

SUMMARY

To mitigate the drawbacks of conventional solutions for determining which human interaction services to replace with computer-based services, a recommender system for replacing human interaction services based on one or both of technology adoption readiness indices and human technology indices is described. In one or more implementations, at least one computing device receives application usage data describing actions taken by a user with an application. The application usage data is analyzed to identify a technology adoption readiness index indicating how likely the user is to be ready to adopt using the application to perform an additional action. A recommendation for using the application to perform the additional action is caused to be delivered to the user in response to the technology adoption readiness index indicating the user is ready to adopt using the application to perform the additional action.

Additionally or alternatively, at least one computing device analyzes the application usage data to identify, for each of multiple sequences of actions taken by the user with the application, a human technology index indicating an impact a particular action taken by the user with the application has on a key performance indicator (e.g., of a business or organization associated with the application). The human technology indices are analyzed to generate a key performance indicator prediction indicating the impact the particular action has on the key performance indicator. A recommendation encouraging taking the action is caused to be promoted to a manager associated with the application in response to the key performance indicator prediction indicating the particular action is having a positive effect on the key performance indicator. A recommendation discouraging taking the action is caused to be promoted to the manager associated with the application in response to the key performance indicator prediction indicating the particular action is having a negative effect on the key performance indicator.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
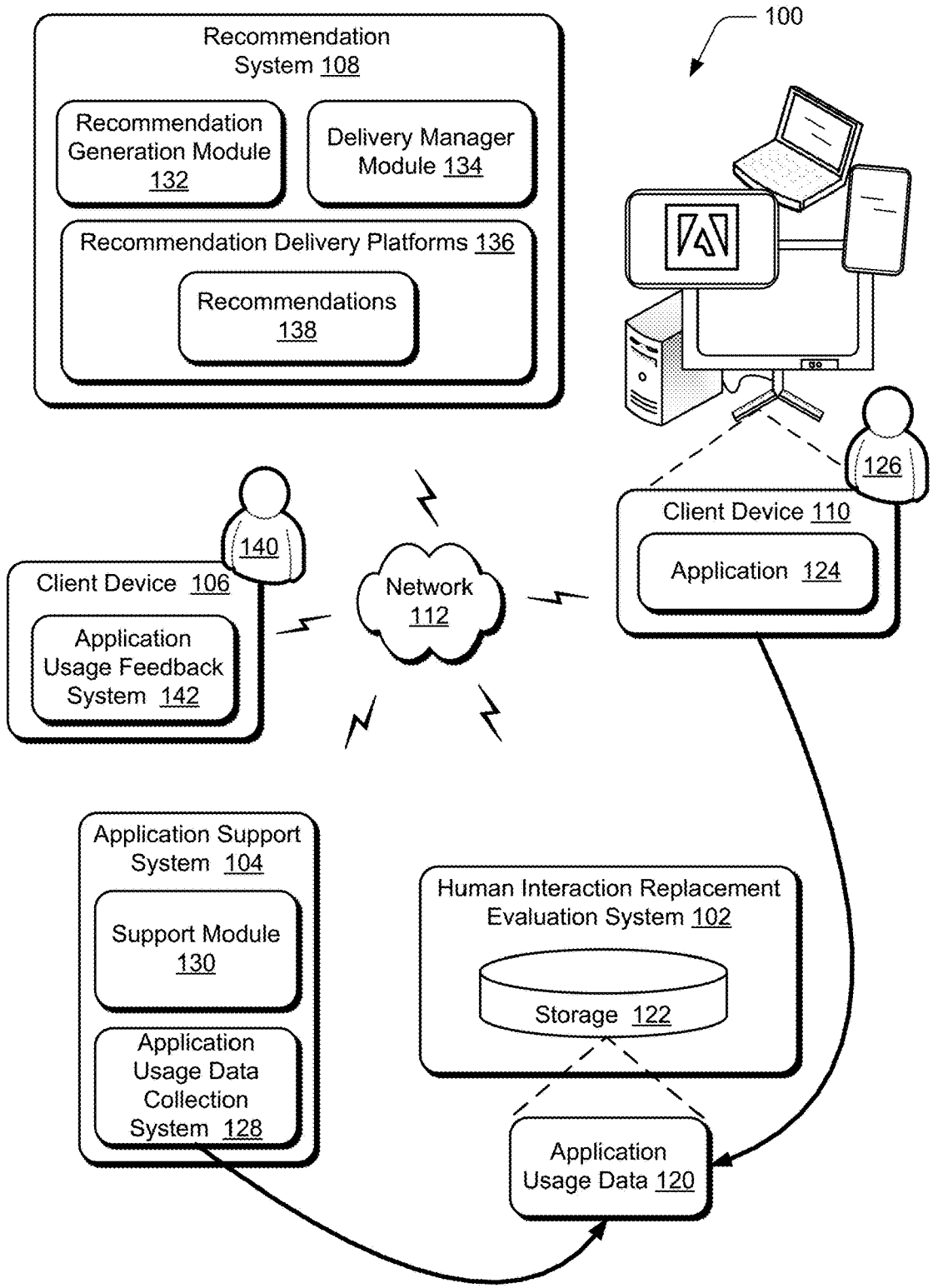
FIG. 1 is an illustration of a digital medium environment in an example implementation that is operable to employ the recommender system for replacing human interaction services described herein.

Techniques for implementing a recommender system for replacing human interaction services are discussed herein.

Generally, the techniques discussed herein analyze actions taken by a user with an application on a client device that provides features to replace human interaction services with computer-based services. The results of the action provide an indication of the success of a particular action supported by the application (e.g., whether the action has a positive or negative effect on a key performance indicator (KPI)) or an indication of how likely the user is to be ready to adopt a particular computer-based service. Recommendations are then provided to the user of the application or a manager of the application indicating actions to use, actions that have negative or positive effects on a KPI, and so forth.

More specifically, a human interaction replacement evaluation system obtains application usage data for users and generates human technology indices and technology adoption readiness indices that are used as a basis for providing recommendations to a user of the application or a manager of the application. The application usage data represents various data regarding usage of an application on client devices, such as an identifier of an action taken by the user with the application, an identifier of the user, a timestamp indicating the time and date that the action was taken, a result of the action, and so forth. The human interaction replacement evaluation system leverages the application usage data by user allowing technology adoption readiness indices and human technology indices to be generated at a user level rather than groups of users.

The human interaction replacement evaluation system organizes the application usage data for a user into sequences of actions referred to as journeys. An example journey is a sequence of checking reward availability, searching, searching, checking reward availability, searching, booking, checking-in, requesting in-stay services, searching, and checking-out. Various rules or criteria are used to identify a journey. For example, an initial journey begins with the earliest action (the entry having the earliest timestamp) in the application usage data and proceeds in order based on the timestamps of the entries. The initial journey ends, for example, in response to various different conditions being met, such as a next particular action (e.g., the next checking-out action), an amount of time elapsing since a particular action (e.g., an amount of time elapsing since a checking-in action), and so forth. This process is repeated with the next journey beginning with the next action after the previous journey ended.

The human interaction replacement evaluation system uses the journeys to generate transition probabilities indicating a probability of each action being the next action in a sequence being performed by the user. For example, if there are N different actions then the human interaction replacement evaluation system generates an N×N matrix identifying, for each initial action N, a probability of the next action (the subsequent action) being each action N. In one or more implementations these action transition probabilities are generated using a machine learning system (e.g., a long short-term memory (LSTM) network) trained to identify, based on the journeys for the user, the probabilities of the user transitioning from each action to each other action in a sequence of actions being performed by the user. Additionally or alternatively, these action probabilities are generated in different manners, such as using Markov modeling where a transition probability is determined by computing the frequency of transitions in the data of the user, using Bayesian analysis to estimate Markov models, and so forth.

An action transition refers to one action is able to happen only if another action happens. For example, checking-in is able to happen only if booking happens. Different action transitions are selected based on the type of application and the features or actions that the application supports. In one or more implementations, transitions of interest are selected by the manager of the application. The human interaction replacement evaluation system generates technology adoption readiness indices based on these action transition probabilities. The technology adoption readiness indices indicate, for each of multiple actions able to be taken using the application, how likely the user is to be ready to adopt using the application to perform the action.

The human interaction replacement evaluation system generates a matrix using the selected action transitions. The matrix has, for example, a number of rows corresponding to the number of different users for which action transition probabilities were generated, and one column for each selected action transition. The action transition probabilities for the selected action transitions for the corresponding users are the values in the matrix. Each column of transition probabilities is a variable and an x-by-x variance-covariance matrix is generated corresponding to these x variables, where x refers to the number of selected action transitions.

The human interaction replacement evaluation system optionally normalizes the x-by-x variance-covariance matrix, such as by re-scaling the matrix to arrive at a correlation matrix. The human interaction replacement evaluation system generates principal components for the variance-covariance matrix using various principal component analysis techniques. For example, the human interaction replacement evaluation system applies eigen decomposition to the normalized variance-covariance matrix to obtain the product of vectors and corresponding values (e.g., eigenvectors and eigenvalues). Some of the eigenvalues are selected, such as eigenvalues that are sufficiently large (e.g., substantially larger than 1) or the largest eigenvalues that together explain a sufficiently large amount of the variance (e.g., at least 95% of the variance). The elements of the eigenvectors corresponding to these selected eigenvalues are used as weights for the variables.

Each eigenvector has multiple elements each of which corresponds to one of the variables (one of the action transitions in this situation). For a given technology adoption readiness index, the index is a weighted sum of the variables corresponding to the eigenvector elements that are significant values. These significant values are defined in various manners, such as values above a particular threshold (e.g., 0.50), values that are non-zero, and so forth. The weight for each variable is the corresponding element of the eigenvector.

The technology adoption readiness indices that are generated are thus based on the results of the principal component analysis of the variance-covariance matrix and the corresponding action transition probabilities. These technology adoption readiness indices indicate how likely the user is to be ready to adopt a particular computer-based service based on the action transition probabilities.

The human interaction replacement evaluation system provides these technology adoption readiness indices to a recommendation system. The recommendation system uses the technology adoption readiness indices in a variety of different manners. For example, assume for a given user Index 1 (e.g., for a hospitality application, "in-stay" actions as a result of a "booking" action) is high but Index 2 (e.g., for a hospitality application, "mobile key" actions as a result of a "checking-in" action) is low. Accordingly, given the high value of Index 1 the recommendation system generates recommendations encouraging the user (or incentivizing the user with financial discounts) to use additional features of the application that are related to in-stay actions that replace human interaction services. Examples of such additional features include placing upgrade requests for future bookings, ordering food or other services, and so forth. Additionally or alternatively, given the low value of Index 2, the recommendation system generates recommendations (e.g., notifications) querying the user regarding her concerns about mobile key actions or information describing the benefits of mobile key actions.

Additionally or alternatively, multiple users are grouped together based on their technology adoption readiness indices if desired. Any of a variety of techniques are used to group users together, such as K-means clustering based on the users' technology adoption readiness indices. This allows, for example, groups of users with similar technology adoption readiness indices to be treated by the recommendation system equally.

In addition to or in place of generating the technology adoption readiness indices, the human interaction replacement evaluation system generates human technology indices based on the application usage data. The human technology indices are values assigned to one or both of 1) any one or more of various actions taken by users when using the application and 2) the results of those actions, and are used as guideposts for evaluation of use of computer-based services by the users. The human technology indices are subsequently used to generate a likelihood of one or more actions having a positive or negative effect on future actions of a user (e.g., the success of the application in replacing human interaction services). For example, does an unsuccessful attempt to use a mobile key with the application to unlock a room have a positive or negative effect on that same user using the application to book a future stay.

In one or more implementations, the manager of the application specifies one or more KPIs that she is interested in. Additionally, the manager is able to specify which actions or action results of the application correspond to a KPI and those actions or action results are used to generate the human technology indices. The manager selects different actions or action results based on the type of application, the features or actions that the application supports, and the desires of the manager. Additionally or alternatively, actions or action results are selected automatically by the human technology index generation module. For example, if a new action is added to the application then that action is automatically selected as corresponding to a KPI.

The human interaction replacement evaluation system generates a matrix using the selected actions or action results. The matrix has, for example, a number of rows corresponding to the number of different journeys of the user as indicated in the application usage data, and one column for each selected action or action result. Each column of actions or action results is a variable and an x-by-x variance-covariance matrix is generated corresponding to these x variables, where x refers to the number of selected actions or action results. The values in the matrix indicate, for each journey, how many times an action was performed or how many times an action result was received.

The human interaction replacement evaluation system normalizes the x-by-x variance-covariance matrix, such as by re-scaling the matrix to obtain a correlation matrix. Eigen decomposition or another principal component analysis technique is applied to the normalized variance-covariance matrix to obtain the product of vectors and corresponding values (e.g., eigenvectors and eigenvalues). The eigen decomposition or other principal component analysis is performed analogous to the discussion above regarding generation of the technology adoption readiness indices, except that the variables used for generation of the human technology indices are the actions rather than action transitions.

The human interaction replacement evaluation system generates the human technology indices using the selected actions and the weights from the eigenvectors. Because the eigen decomposition provides different eigenvectors that are orthogonal, the human technology index generation module generates different indices. The eigenvector has multiple elements each of which corresponds to one of the variables. For a given index, the index is a weighted sum of the variables corresponding to the eigenvector elements that are significant values. These significant values are defined in various manners, such as values above a particular threshold (e.g., 0.50), values that are non-zero, and so forth. The weight for each variable is the corresponding element of the eigenvector.

The human technology indices that are generated are thus based on the results of the principal component analysis of the variance-covariance matrix and the corresponding actions or action results. These human technology indices are values that are usable in a regression model with a KPI as a target label to find the impact that certain actions or action results have on the KPI.

The human technology indices are generated for each journey of the user in the application usage data, allowing the recommendation system to make recommendations at an individual user level rather than at a multiple user level. Additionally or alternatively, multiple users are grouped together based on their human technology indices if desired. Any of a variety of techniques are used to group users together, such as K-means clustering based on the users' human technology indices. This would allow, for example, a regression model to be run on a group of users if there is insufficient data (e.g., less than a threshold number of journeys) to run the regression model on individual users in the group. In such situations, groups of users with similar human technology indices are treated by the recommendation system equally.

The human interaction replacement evaluation system generates one or more KPI predictions from the human technology indices. The KPI predictions are predictions of how one or more actions in the application affect another action (a KPI) in the application. For example, what kind of impact does the action of using an in-stay service that is an information search on the application have on a KPI of using the application to make future bookings (e.g., a positive or negative impact, how large or small of an impact, and so forth).

In one or more implementations, the human interaction replacement evaluation system implements a machine learning system, such as a regression model, to predict whether the one or more actions in the application affect another action in the application. The regression model is implemented using any of a variety of different public or proprietary techniques. The generated human technology indices as well as a target label for each journey are used as the input to train the regression model (e.g., a 75:25 train:test split of the human technology indices is used to train the regression model).

The KPI prediction includes various values, such as a coefficient generated by the regression model and optionally a standard error generated by the regression model and a p value from an F-test or a t-test. The KPI prediction for an action is a value indicating the effect that action has on the corresponding KPI.

The recommendation system uses the KPI predictions in one or more of a variety of different manners. For example, assume the application is a hospitality application, a KPI is the action booking a reservation using the application, and one KPI prediction (indicating the effect the actions of downloading a mobile key and using the mobile key to unlock a room have on the KPI) is high but another KPI prediction (indicating the effect the action of performing an in-stay service of information search has on the KPI) is low. Accordingly, the recommendation system generates recommendations encouraging the manager of the application to remove or discourage use of features from the application related to in-stay services of information search, or improve the features related to in-stay services of information search. Additionally or alternatively, the recommendation system generates recommendations encouraging the manager to promote usage of mobile key usage to other users.

In one or more implementations the human technology indices are generated for each user but combined by the human interaction replacement evaluation system or recommendation system for generation of recommendations. For example, if greater than a threshold number of users have a low human technology index, the recommendation system generates recommendations encouraging the manager to remove or discourage use of features from the application related to the action in that human technology index or improve the features to make them more user friendly. By way of another example, if greater than a threshold number of users have a high human technology index, the recommendation system generates recommendations encouraging the manager to add or promote usage of features from the application related to the action in that human technology index.

The techniques discussed herein improve usability of a computing device by having applications that support various features and actions, and encouraging users to take the actions that the users want or are likely to enjoy using the application for. This allows the computing device to be used in a manner that is enjoyable to the user and improves user satisfaction with the computing device. This further allows various human interaction services to be replaced with computer-based services, focusing on promoting the computer-based service that the users enjoy.

Furthermore, the techniques discussed herein improve the creation of features in the application, giving application managers and developers an indication of which features are adding convenience to the application and which features are causing issues or user problems with the application. This allows application development to be improved, with features that are causing issues or user problems being removed from the application. This streamlines the application and reduces resource usage (e.g., power or storage) by the application due to support for features that are causing issue or user problems being removed from the application.

Term Descriptions

These term descriptions are provided for purposes of example only and are not intended to be construed as limiting on the scope of the claims.

The term "computer-based services" refers to services that a user uses by interacting with a computing device rather than another human. For example, using an application to check-in to a hotel room and obtain a mobile key for the hotel room.

The term "human interaction services" refers to services that a user uses by interacting with another human. For example, speaking with a person at a hotel front desk to check-in to a room and obtain a room key.

The term "feature" refers to functionality of an application that provides a computer-based service to the user. The user takes one or more actions with the application to make use of the functionality.

The term "journey" refers to a sequence of actions taken by the user using an application.

The term "key performance indicator" or "KPI" refers to a value indicating the success of a particular action taken with the application, such as whether one action has a positive or negative effect on another action. For example, what effect does usage of a mobile key have on generating future bookings through the computer-based services.

The term "human technology index" refers to a value assigned to various actions taken by users when using an application and are used in a regression model with a KPI as a target label to find the impact that the actions or results of the actions have on the KPI. These values are used to evaluate use of computer-based services by the users (e.g., the success of the application in replacing human interaction services).

The term "technology adoption readiness index" refers to a value indicating how likely a user is to be ready to adopt a particular computer-based service. For example, how likely a user is to be ready to start taking particular actions with an application rather than human interaction services.

The term "KPI prediction" refers to an indication of the impact on a given KPI of replacing a human interaction service with a computer-based service In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the recommender system for replacing human interaction services described herein. The illustrated environment 100 includes a human interaction replacement evaluation system 102, an application support system 104, a client device 106, a recommendation system 108, and another client device 110 that communicate with each other via a network 112.

Computing devices that are usable to implement the human interaction replacement evaluation system 102, the application support system 104, the recommendation system 108, and the client devices 106 and 110 are configured in any of a variety of ways. A computing device, for instance, is configured as one of a desktop computer, a laptop computer, a mobile device (e.g., assuming a handheld configuration such as a tablet or mobile phone), a wearable device (e.g., a watch or other jewelry, virtual reality glasses, augmented reality glasses), and so forth. Thus, the computing device configurations ranges from full resource devices with substantial memory and processor resources (e.g., personal computers, game consoles) to low resource devices with limited memory and/or processing resources (e.g., mobile devices). Additionally, in one or more implementations a computing device is representative of a plurality of different devices, such as multiple servers utilized by a business to perform operations "over the cloud" as further described in relation to FIG. 8.

The systems of digital medium environment 100 are optionally implemented on different devices. Additionally or alternatively, two or more of the systems of digital medium environment 100 are implemented by the same computing device. For example, a single computing device implements the human interaction replacement evaluation system 102 and the recommendation system 108. The computing device on which two or more of the systems of digital medium 100 are implemented is, for example, the client device 106.

The human interaction replacement evaluation system 102 evaluates various data to generate different indices or predictions regarding human interaction services that are replaceable by computer-based services. The human interaction replacement evaluation system 102 generates one or both of a technology adoption readiness index and a human technology index to predict a key performance indicator (KPI) prediction. The technology adoption readiness index is an indication of how likely a particular user is to be ready to adopt a particular computer-based service. One or more technology adoption readiness indices are generated for a user for each of multiple different computer-based services, and different technology adoption readiness indices are optionally generated for different users. Additionally or alternatively, one or more human technology indices are generated for users and used in a regression model with a KPI as a target label to find the impact that the actions or results of the actions have on the KPI.

The human interaction replacement evaluation system 102 uses various different application usage data 120 in a storage 122. The storage 122 is any one or more of a variety of different types of storage, such as random access memory (RAM), Flash memory, solid state drive, magnetic disk drive, and so forth.

To identify the technology adoption readiness index and human technology index, the human interaction replacement evaluation system 102 uses the application usage data 120. The application usage data 120 generally represents various data regarding usage of an application 124 on the client device 110. The application usage data 120 is also referred to as a behavior log or activity on application data for the application 124. The application 124 provides the user interface for a user 126 of the client device 110 to use the computer-based services rather than human interaction services. The application 124 provides any of a variety of different functionality based on the company or organization that is replacing the human interaction services. For example, assume the application 124 includes features allowing the user 126 to perform actions such as booking a hotel stay, checking-in to a hotel, obtaining a mobile key for her hotel room, requesting in-stay services (e.g., ordering room service), and so forth. The application usage data 120 includes data describing the various actions taken by the user 126 using the application 124 along with a timestamp indicating the time and date that the actions were taken and optionally a result of the action (e.g., a mobile key was or was not successfully obtained for a hotel room).

Various examples are included herein with reference to the application 124 being a hospitality application (e.g., for a hotel). However, it is to be appreciated that the techniques discussed herein are usable with various different types of applications. For example, assume the application is a medical application (e.g., for use in a hospital, doctor's office, at home, etc.). In such situations the medical application includes various features, such as automatically measuring a user's temperature, automatically measuring a user's heart rate or pulse, automatically determining whether a user's pupils are dilated, automatically contacting a medical professional (e.g., if one or more measurements exceed or fall below a threshold), and so forth. By way of another example, assume the application is a financial application that includes various features such as searching for information (e.g., regarding loans, investments, or savings), opening accounts (e.g., for loans, investments, or savings), transferring money from one account to another, buying or selling investments (e.g., certificates of deposit, stocks, or mutual funds), and so forth. By way of another example, assume the application is a concierge application (e.g., for use in a theme park or casino), that includes various features such as reservation actions (e.g., for a ride, game, or restaurant), purchasing actions (e.g., electronic tickets for park entry or restricted casino room entry, souvenirs), crowd estimates (e.g., for a ride, game, or restaurant), electronic chips, and so forth.

The application usage data 120 is collected in various manners. In one or more implementations, the application 124 collects and provides the application usage data 120 to the human interaction replacement evaluation system 102. Additionally or alternatively, the application usage data 120 is collected by an application usage data collection system 128 on the application support system 104. In such situations, the application usage data collection system 128 monitors and collects the application usage data 120 and provides the application usage data 120 to the human interaction replacement evaluation system 102. This usage of the application 124 optionally includes accessing one or more support modules 130. The support module 130 operates to support the operation of the application 124 and takes various forms, such as webpages that are returned to the application 124 for display or other data for use by the application 124 (e.g., hotel availability in response to a booking request, a mobile key, and so forth).

The recommendation system 108 includes a recommendation generation module 136 and a delivery manager module 134 that implements and exposes recommendation delivery platforms 136. The recommendation delivery platforms 136 represent different mediums by which recommendations are exposed, such as websites, network-accessible applications (e.g., application 124), content streaming services, and so forth. The recommendation delivery platforms 136 are leveraged by the delivery manager module 134 to deliver recommendations 138 generated by the recommendation generation module 132. Examples of the recommendations 138 include advertisements for features of the application 124, descriptions of incentives for the user 126 to try a particular feature of the application 124, and so forth.

The user 126 of the client device 110 leverages the application 124 to interact with a particular recommendation delivery platform 136 and to consume a recommendation 138. The recommendation 138 is consumed in various manners, such as read by the user, selection of an option (e.g., a link or button) to install, activate, or use a feature on the application 124, and so forth.

The human interaction replacement evaluation system 102 uses the application usage data 120 to generate a technology adoption readiness index for the user 126. The recommendation generation module 132 uses the technology adoption readiness index for the user to generate recommendations 138 for the user 126 to try different computer-based services of the application 124.

The recommendation delivery platforms 136 is additionally or alternatively leveraged by the delivery manager module 134 to deliver recommendations 138 generated by the recommendation generation module 132 to the client device 106. Examples of the recommendations 138 that are provided to the client device 106 include identifications of features of the application 124 (e.g., actions taken by the user using the application 124) that are having a positive impact on particular KPI, recommendations to discontinue or disable features of the application 124 that are having a negative impact on a particular KPI, and so forth.

A user of the client device 106, referred to as manager 140, leverages an application usage feedback system 142 to interact with a particular recommendation delivery platform 136 and to consume a recommendation 138. The manager 140 consumes the recommendation 138 in various manners, such as by reading the recommendation, selecting an option (e.g., a link or button) to deactivate or disable a feature on the application 124, and so forth. The manager 140 is a person that manages the application 124, such as a marketer or analyst for a company that created or uses the application 124, a developer of the application 124, and so forth. The manager 140 also optionally interacts with the human interaction replacement evaluation system 102 to input various criteria for generating recommendations as discussed in more detail below.

The human interaction replacement evaluation system 102 uses the application usage data 120 to generate a KPI prediction for a feature of the application 124. The recommendation generation module 132 uses the KPI prediction for the feature to generate recommendations 138 for the manager 140 to, for example, deactivate or disable features of the application 124.

Although a single user 126 is illustrated in FIG. 1, the human interaction replacement evaluation system 102 optionally uses data from multiple users 126 of multiple different client devices 110. Accordingly, in such situations the application usage data 120 includes application usage data for multiple different users. Each user 126 has an identifier that is tracked in the digital media environment 100. This tracking takes various forms, such as a cookie or other identifier provided by the application 124 to the application support system 104 and the recommendation system 108. The application usage data 120 collected by the application 124 or the application usage data collection system 128 include this identifier, allowing the human interaction replacement evaluation system 102 to know which item application usage data 120 corresponds to which user. This tracking allows the recommendation system 108 to deliver recommendations tailored to the individual users. Although a user is tracked the actual identity of that user need not be tracked or known. E.g., the name of the user need not be tracked.

Human Interaction Replacement Evaluation System Architecture

Figure 2:
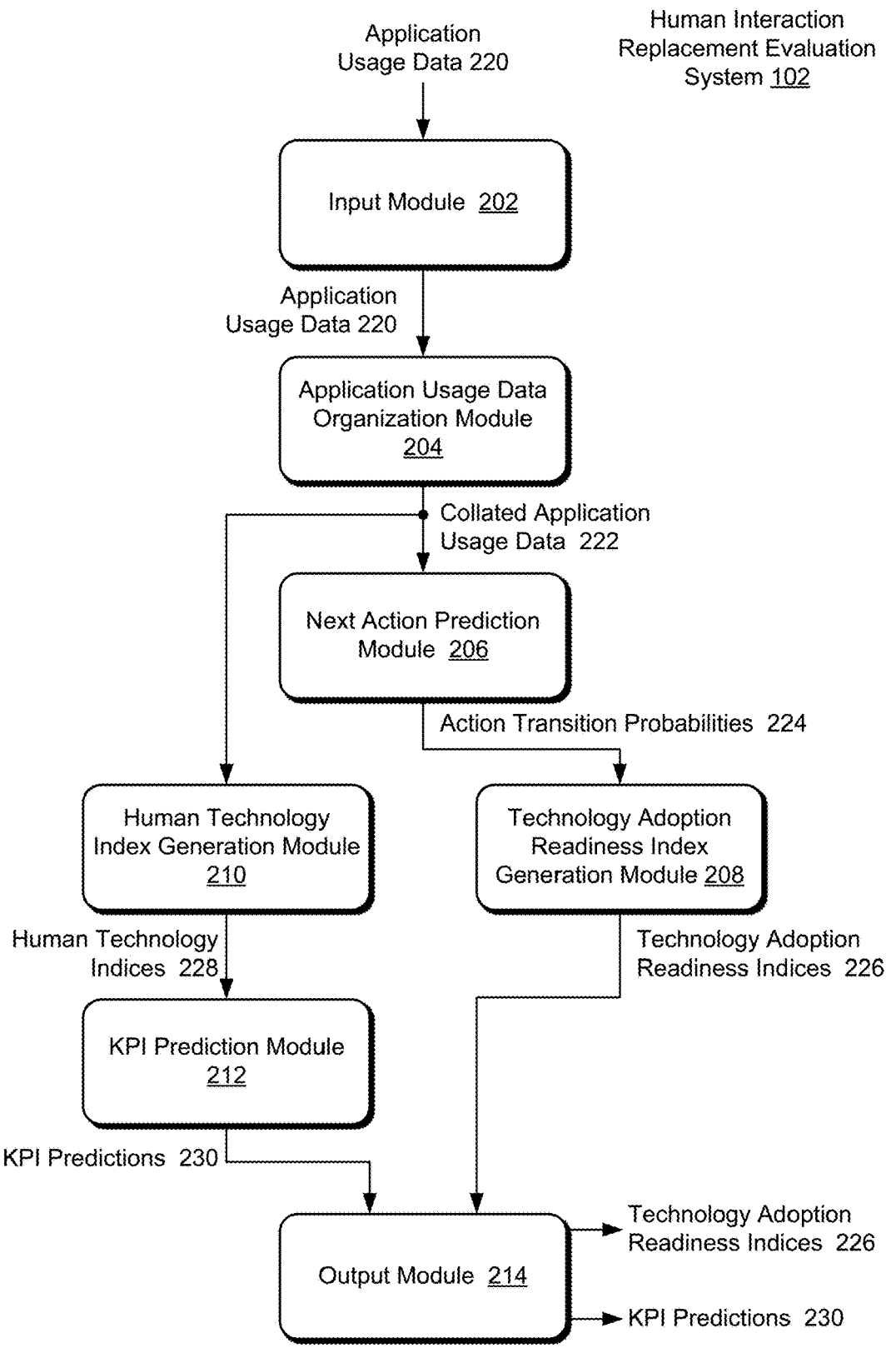
FIG. 2 is an illustration of an example architecture of a human interaction replacement evaluation system.

FIG. 2 is an illustration of an example architecture of a human interaction replacement evaluation system 102. The human interaction replacement evaluation system 102 includes an input module 202, an application usage data organization module 204, a next action prediction module 206, a technology adoption readiness index generation module 208, a human technology index generation module 210, a KPI prediction module 212, and an output module 214.

The input module 202 implements functionality to receive application usage data 220. The application usage data 220 is the application usage data 120 collected by one or both of the application 124 and the application usage data collection system 128 of FIG. 1, and is received by the input module 202 from, for example, the storage 122 of FIG. 1. The input module 202 provides the application usage data 220 to the application usage data organization module 204. In one or more implementations the application usage data 220 includes application usage data for multiple users. However, in situations in which only human technology indices (and not technology adoption readiness indices) are being generated as discussed in more detail below, the application usage data 220 optionally includes application usage data for a single user.

The application usage data organization module 204 implements functionality to identify the portion of the application usage data 220 that corresponds to the user 126 of the application 124 of FIG. 1. The application usage data 220 includes data describing the various actions taken by one or more users 126 using the application on one or more client devices. For each action taken by a user, the application usage data 220 includes a record or entry including, for example, an identifier of the action, an identifier of the user, and a timestamp indicating the time and date that the action was taken. The application usage data 220 optionally includes the results of actions that were taken. The application usage data organization module 204 thus readily identifies the records or entries corresponding to the user 126.

The actions that are able to be taken using the application 124 refer to different actions that are performable via the application 124, including actions that are computer-based services that replace human interaction services. For example, if the application 124 is a hospitality application for a hotel, example actions include checking reward availability, searching, booking, checking-in, downloading mobile key, unlocking attempt using mobile key, requesting in-stay services using the application, checking-out, and so forth. These actions also have various results, such as failure of downloading mobile key attempt, success of downloading mobile key attempt, failure of unlocking attempt using mobile key, success of unlocking attempt using mobile key, and so forth. In one or more implementations, the manager 140 specifies which actions taken using the application 124 are to be used by the human interaction replacement evaluation system 102, and the application usage data organization module 204 extracts the records or entries identifying the specified actions from the application usage data 220.

Various additional parameters are optionally set to allow the manager 140 of FIG. 1 to identify which portion of the application usage data 220 is to be used to generate the technology adoption readiness index and KPI prediction. Examples of these parameters include timestamp parameters (e.g., particular date ranges or time ranges), categories of users (e.g., based on a loyalty club level or ranking), and so forth.

In one or more implementations, the human interaction replacement evaluation system 102 generates technology adoption readiness indices and human technology indices at an individual user level rather than at a group level. The human interaction replacement evaluation system 102 generates one or both of technology adoption readiness indices and human technology indices for any number of different individual users. For example, the human interaction replacement evaluation system 102 generates technology adoption readiness indices and human technology indices for individual users in two groups (e.g., example groups include different loyalty club levels or rankings) and compare the technology adoption readiness indices and human technology indices for the different groups. Additionally or alternatively, technology adoption readiness indices and human technology indices are generated at a group level using any criteria that the manager 140 desires (e.g., example groups include different loyalty club levels or rankings).

The application usage data organization module 204 also analyzes the portion of the application usage data 220 that corresponds to the user 126 of the application 124 and organizes that portion of the application usage data 220 into journeys. A journey refers to a sequence of actions taken by the user 126 using the application 124. These journeys are readily determined based on the records or entries, which identify actions and timestamps, in the application usage data 220. An example of a journey is a sequence of checking reward availability, searching, searching, checking reward availability, searching, booking, checking-in, requesting in-stay services, searching, and checking-out.

Various rules or criteria are used to identify a journey. For example, an initial journey begins with the earliest action (the entry having the earliest timestamp) in the portion of the application usage data 220 and proceeds in order based on the timestamps of the entries. The initial journey ends, for example, in response to various different conditions being met, such as a next particular action (e.g., the next checking-out action), an amount of time elapsing since a particular action (e.g., an amount of time elapsing since a checking-in action), and so forth. This process is repeated with the next journey beginning with the next action after the previous journey ended.

The portion of the application usage data 220 that is to be used to generate the technology adoption readiness index and human technology index (e.g., the portion of the application usage data 220 that corresponds to the user 126 of the application 124) is output as collated application usage data 222. An identification of the journeys is also included in the collated application usage data 222.

The next action prediction module 206 implements functionality to predict, based on the journeys, a next action for the user 126. The next action prediction module 206 generates transition probabilities indicating a probability of each action being the next action in a sequence being performed by the user 126. For example, if there are N different actions specified by the manager 140 then the next action prediction module 206 generates an N×N matrix identifying, for each initial action N, a probability of the next action (the subsequent action) being each action N. In some situations an action is repeated in a sequence of actions, in which case the same action is the initial action and the subsequent action. The next action prediction module 206 outputs these transition probabilities as action transition probabilities 224.

In one or more implementations, the next action prediction module 206 implements a machine learning system. Machine learning systems refer to a computer representation that is tuned (e.g., trained) based on inputs to approximate unknown functions. In particular, machine learning systems include a system that utilizes algorithms to learn from, and make predictions on, known data by analyzing the known data to learn to generate outputs that reflect patterns and attributes of the known data. Examples of a machine learning system include decision trees, support vector machines, linear regression, logistic regression, Bayesian networks, random forest learning, dimensionality reduction algorithms, boosting algorithms, artificial neural networks, deep learning, and so forth.

One example machine learning system is a recurrent neural network, such as a long short-term memory (LSTM). An LSTM is formed of one or more cell blocks each including various components such as a cell that remembers values, an input gate, an output gate, a forget gate, and so forth.

Another example machine learning system is one or more convolutional neural networks (CNNs). A CNN is formed from layers of nodes (i.e., neurons) and includes various layers such as an input layer, an output layer, and one or more hidden layers such as convolutional layers, pooling layers, activation layers, fully connected layers, normalization layers, and so forth.

Additionally or alternatively, the next action prediction module 206 is implemented in other manners, such as using Markov modeling where a transition probability is determined by computing the frequency of transitions in the data of the user, using Bayesian analysis to estimate Markov models, and so forth.

The machine learning system is trained to identify, based on the journeys, the probabilities (also referred to as transition probabilities or action transition probabilities) of the user transitioning from each action to each other action in a sequence of actions being performed by the user 126. An action transition refers to one action is able to happen only if another action happens. For example, checking-in is able to happen only if booking happens. Different action transitions are selected based on the type of application 124 and the features or actions that the application 124 supports. In one or more implementations, transitions of interest are selected by the manager 140. In one or more implementations, the machine learning system is trained by providing training data including the journeys in the collated application usage data 222. The machine learning system predicts, in the sequence of actions in the journeys, the next action to be performed by the user, compares the predicted action to the next action that actually did occur, and adjusts various weights in the machine learning system to minimize a loss function. Any of a variety of loss functions are minimized, such as a sparse categorical cross-entropy loss function.

These transition probabilities are generated on a per-user basis even if the collated application usage data 222 includes application usage data for multiple users. Thus, for example, a separate machine learning system is trained for each of the multiple users, a single machine learning system is used for multiple users but retrained for each user, and so forth.

The technology adoption readiness index generation module 208 implements functionality to generate the technology adoption readiness indices 226 based on the action transition probabilities 224. The technology adoption readiness indices 226 include, for each of multiple actions that are able to be taken using the application 124, a technology adoption readiness index that is an indication of how likely the user 126 is to be ready to adopt using the application to perform the action.

In one or more implementations, the manager 140 specifies which action transitions of the application 124 are to be used to generate the technology adoption readiness indices 226. The manager selects action transitions based on various criteria, such as action transitions that are of interest to the manager 140, actions transitioned to (e.g., the manager 140 is interested in determining which users have a high probability of transitioning to using the application 124 for booking actions), and so forth. Additionally or alternatively, action transitions are selected automatically by the technology adoption readiness index generation module 208. For example, if a new action was recently added to the application 124 then action transitions that transition to that new action are automatically selected by the technology adoption readiness index generation module 208.

For the action transitions, the notation A/B is used to indicate action A is able to happen only if action B happens. If B happens, A is able to happen, allowing for determination of the probability of A happening given B happening, as discussed in more detail below. For example, the following six action transitions are usable to generate the technology adoption readiness indices 226: Checking-In/Booking (checking-in is able to happen only if booking happens), Mobile Key Downloading/Checking-In (mobile key downloading is able to happen only if checking-in happens), Mobile Key Usage/Checking-In (mobile key usage is able to happen only if checking in happens), In-Stay Service/Booking (in stay service request is able to happen only if booking happens), {In-Stay Service+Search}/Booking (in stay service request of search is able to happen only if booking happens), and {In-Stay Service+Booking}/Booking (in stay service request of booking is able to happen only if booking happens).

The Checking-In/Booking action transition is used to generate a technology adoption readiness index indicating the probability or likeliness of the user transitioning to using the application 124 for booking actions. The In-Stay Service/Booking, {In-Stay Service+Search}/Booking, and {In-Stay Service+Booking}/Booking transitions are used to generate a technology adoption readiness index indicating the probability or likeliness of the user transitioning to using the application 124 for booking actions. The Mobile Key Downloading/Checking-In and Mobile Key Usage/Checking-In transitions is used to generate a technology adoption readiness index indicating the probability or likeliness of the user transitioning to using the application 124 for checking-in actions.

In one or more implementations, the technology adoption readiness index generation module 208 uses fewer than all of the action transition probabilities 224 to generate the technology adoption readiness indices 226, although alternatively the technology adoption readiness index generation module 208 uses all of the action transition probabilities 224. Regardless, the next action prediction module 206 generates the action transition probabilities 224 for all N different actions specified by the manager 140 because those N actions occur in the application 124 and the technology adoption readiness indices are distributed among the N actions. This avoids bias in the generated transition probabilities by focusing only on action transition probabilities used by the technology adoption readiness index generation module 208 to generate the technology adoption readiness indices 226.

The technology adoption readiness index generation module 208 generates a matrix using the selected action transitions. The matrix has, for example, a number of rows corresponding to the number of different users for which action transition probabilities 224 were generated, and one column for each selected action transition. The action transition probabilities for the selected action transitions for the corresponding users are the values in the matrix. Each column of transition probabilities is a variable and an x-by-x variance-covariance matrix is generated corresponding to these x variables, where x refers to the number of selected action transitions.

The technology adoption readiness index generation module 208 normalizes the x-by-x variance-covariance matrix, such as by using a correlation matrix. The technology adoption readiness index generation module 208 then applies principal component analysis to generate principal components for the variance-covariance matrix (e.g., x principal components). The technology adoption readiness index generation module 208 selects the principal components that together explain a sufficiently large amount of the variance (e.g., at least 95% of the variance). Each selected principal component has multiple values referred to as weights, including one weight for each of the x variables in the variance-covariance matrix. An index is generated for each selected principal component, with each index being a weighted sum of variable values from the variance-covariance matrix that have a corresponding significant weight.

The technology adoption readiness index generation module 208 uses any of a variety of public or proprietary principal component analysis techniques to generate the principal components. In one or more implementations, the technology adoption readiness index generation module 208 generates the principal components by applying eigen decomposition to the normalized variance-covariance matrix to obtain the product of vectors and corresponding values (e.g., eigenvectors and eigenvalues). The technology adoption readiness index generation module 208 selects the eigenvalues that are sufficiently large (e.g., substantially larger than 1) or the largest eigenvalues that together explain a sufficiently large amount of the variance (e.g., at least 95% of the variance). The elements of the eigenvectors corresponding to these selected eigenvalues are used as weights for the variables.

The technology adoption readiness index generation module 208 generates a technology adoption readiness index corresponding to each selected eigenvalue using the weights from the corresponding eigenvectors. Because the eigen decomposition provides different eigenvectors that are orthogonal, the technology adoption readiness index generation module 208 generates different indices. The eigenvector has multiple elements each of which corresponds to one of the variables (one of the action transitions in this case). For a given index, the index is a weighted sum of the variables corresponding to the eigenvector elements that have significant values. These significant values are defined in various manners, such as values above a particular threshold (e.g., 0.50), values that are non-zero, and so forth. The weight for each variable is the corresponding element of the eigenvector.

These indices are generated for each user and indicate the user's application technology adoption readiness. For example, continuing with the example of six action transitions above, one index is generated related to "in-stay" actions as a result of a booking action, another related to "mobile key" actions as a result of a "checking-in" action, and another related to the "checking-in" action as a result of a booking action. For example, the following indexes are generated:

Index 1: 0.55*P(In-Stay Service/Booking)+0.58*P({In-Stay Service+Search}/Booking)+0.56*P({In-Stay Service+Booking}/Booking)

Index 2: 0.69*P(Key Downloading/Checking-In)+0.69*P(Key Usage/Checking-In), where Key Downloading={Mobile Key Downloading with Mobile Key Download Failure result} and Key Usage={Mobile Key Usage (e.g., unlocking) with Mobile Key Usage Failure result}

Index 3: P(Checking-In/Booking)

For these example indexes, the numeric values are the weights from the eigenvectors and the terminology P(X) refers to the action transition probabilities 224.

The technology adoption readiness indices that are generated are thus based on the results of the principal component analysis of the variance-covariance matrix and the corresponding action transition probabilities 224. These technology adoption readiness indices indicate how likely the user is to be ready to adopt a particular computer-based service based on the action transition probabilities 224.

The technology adoption readiness index generation module 208 outputs these technology adoption readiness indices as technology adoption readiness indices 226. The technology adoption readiness index generation module 208 generates technology adoption readiness indices 226 for each of multiple users. This allows the recommendation system 108 to make recommendations at an individual user level rather than at a multiple user level.

Additionally or alternatively, multiple users are grouped together based on their technology adoption readiness indices 226 if desired. Any of a variety of techniques are used to group users together, such as K-means clustering based on the users' technology adoption readiness indices. This would allow, for example, groups of users with similar technology adoption readiness indices to be treated by the recommendation system 108 equally.

The recommendation system 108 uses the technology adoption readiness indices 226 in a variety of different manners. Continuing with the example above of three technology adoption readiness indices, assume for a given user Index 1 ("in-stay" actions as a result of a "booking" action) is high but Index 2 ("mobile key" actions as a result of a "checking-in" action) is low. Accordingly, the recommendation system 108 generates recommendations 138 encouraging the user 126 (or incentivizing the user with financial discounts) to use additional features of the application 124 that are related to in-stay actions that replace human interaction services. Examples of such additional features include placing upgrade requests for future bookings, ordering food or other services, and so forth. Additionally or alternatively, the recommendation system 108 generates recommendations 138 querying the user regarding her concerns about mobile key actions or information describing the benefits of mobile key actions.

The recommendation system 108 uses various different threshold values for the indices to determine what recommendations 138 to generate and deliver. An example of these threshold values are fixed values (e.g., generate a recommendation 138 encouraging the user 126 to use the additional features of the application 124 that are related to in-stay actions if Index 1 has a value of at least 0.8, or generate a query for the user regarding concerns about mobile key actions if Index 2 has a value of less than 0.2). As another example, these threshold values are variable and selected by the manager 140.

In addition to the technology adoption readiness indices 226, the human technology index generation module 210 implements functionality to generate human technology indices 228 based on the collated application usage data 222. The human technology indices 228 are values assigned to one or both of various actions taken by users 124 when using the application 124 and the results of those actions, and are used as guideposts for evaluation of use of computer-based services by the users 124. The human technology indices 228 are subsequently used to generate a likelihood of one or more actions having a positive or negative effect on future actions of a user (e.g., the success of the application in replacing human interaction services). For example, does an unsuccessful attempt to use a mobile key with the application 124 to unlock a room have a positive or negative effect on that same user using the application 124 to book a future stay.

In one or more implementations, the manager 140 specifies one or more KPIs that she is interested in. Additionally, the manager 140 specifies which actions or action results of the application 124 correspond to a KPI and those actions or action results are used to generate the human technology indices 228. Different actions or action results are selected based on the type of application 124, the features or actions that the application 124 supports, and the desires of the manager 140. Additionally or alternatively, actions or action results are selected automatically by the human technology index generation module 210. For example, if a new action is added to the application 124 then that action is automatically selected by the human technology index generation module 210 as corresponding to a KPI.

For example, the manager 140 specifies that she is interested in whether mobile key usage or downloading has an effect on future booking. Accordingly, for the KPI of future booking, booking as well as mobile key usage and downloading actions, and optionally the results of those actions, are used to generate the human technology indices 228. By way of another example, the manager 140 specifies that she is interested in what future actions mobile key usage has a positive or negative effect on. Accordingly, a KPI is generated for each of multiple actions of the application 124 (e.g., for each action that is able to occur in a journey after mobile key usage). For each KPI, the action for which that KPI is generated as well as mobile key usage actions, and optionally the results of those actions, are used to generate the human technology indices 228. By way of another example, the manager 140 specifies that she is interested in what actions are having the largest negative or positive effect on future booking. Accordingly, a KPI is generated for each of the multiple actions that is able to occur in a journey prior to booking. For each KPI, the action for which that KPI is generated as well as the booking action, and optionally the results of those actions, are used to generate the human technology indices 228. By way of yet another example, the manager 140 specifies that she is interested in what actions are having the largest negative or positive effect on which other actions. According, a KPI is generated for each of multiple actions of the application 124 (e.g., for each computer-based service action that is able to be performed on the application 124). For each KPI, the action for which that KPI is generated as well as one other action, and optionally the results of those actions, are used to generate the human technology indices 228 (so all possible combinations are evaluated by the human interaction replacement evaluation system 102).

In one or more implementations, some actions are broken down into multiple constituents. For example, "Mobile Key" actions are broken down into constituent actions "Mobile Key Download" and "Mobile Key Use" because "Mobile Key Download" does not necessarily result in "Mobile Key Use." Possible results for the actions are also identified, such as "Mobile Key Download Failure," "Mobile Key Unlock Failure," "Mobile Key Download Success," and "Mobile Key Unlock Success." The constituents for an action, and the possible results, are specified in various manners, such as by the manager 140, by a machine learning system trained to identify constituents and results for an action based on the collated application usage data 222, and so forth. In one or more implementations, actions are broken down into multiple constituents that are, for example, interpretable (e.g., have a particular or specific meaning) and actionable (e.g., useful recommendations are able to be provided based on the actions). This allows for evaluation of key performance indicators with finer granularity.

The human technology index generation module 210 generates a matrix using the selected actions or action results. The matrix has, for example, a number of rows corresponding to the number of different journeys of the user 126 as indicated in the collated application usage data 222, and one column for each selected action or action result.

Each column of actions or action results is a variable and an x-by-x variance-covariance matrix is generated corresponding to these x variables, where x refers to the number of selected actions or action results. In contrast to the matrix generated by the technology adoption readiness index 208 having a number of rows corresponding to the number of different users for which action transition probabilities 224 were generated, the matrix generated by the human technology index generation module 210 has a number of rows corresponding to the number of different journeys by the same user and across all users.

The values in the matrix indicate, for each journey, how many times an action was performed (zero or more) or how many times an action result was received (zero or more). As an example, the matrix indicates, for each of twenty different journeys for the user 126, how many times the action "Mobile Key Download" was performed, how many times the action "Mobile Key Use" was performed, how many times the result "Mobile Key Download Failure" was received, how many times the result "Mobile Key Unlock Failure" was received, how many times the result "Mobile Key Download Success" was received, how many times the result "Mobile Key Unlock Success" was received, and so forth.

The human technology index generation module 210 normalizes the x-by-x variance-covariance matrix, such as by using a correlation matrix. The human technology index generation module 210 then applies eigen decomposition or other principal component analysis technique to the normalized variance-covariance matrix to obtain the product of vectors and corresponding values (e.g., eigenvectors and eigenvalues). The eigen decomposition or other principal component analysis is performed analogous to the discussion above regarding generation of the technology adoption readiness indices, except that the variables used by the human technology index generation module 210 are the actions or action results rather than action transitions as used by the technology adoption readiness index generation module 208.

The human technology index generation module 210 selects the eigenvalues that are sufficiently large (e.g., substantially larger than 1) or the largest eigenvalues that together explain a sufficiently large amount of the variance (e.g., at least 95% of the variance). The elements of the eigenvectors corresponding to these selected eigenvalues are used as weights for the variables.

The human technology index generation module 210 generates the human technology indices 228 using the selected actions and the weights from the eigenvectors. Because the eigen decomposition provides different eigenvectors that are orthogonal, the human technology index generation module 210 generates different indices. The eigenvector has multiple elements each of which corresponds to one of the variables. For a given index, the index is a weighted sum of the variables corresponding to the eigenvector elements that are significant values. These significant values are defined in various manners, such as values above a particular threshold (e.g., 0.50), values that are non-zero, and so forth. The weight for each variable is the corresponding element of the eigenvector.

Various human technology indices 228 are generated based on the selected actions or action results. For example, the following indexes are generated:

Human Tech Index 1: 0.71*(Mobile Key Download)+0.71*(Mobile Key Download Failure)

Human Tech Index 2: 0.71*(Mobile Key Unlock)+0.71*(Mobile Key Unlock Failure)

Human Tech Index 3: 0.71*(In-Stay Service)+0.71*(In-Stay Information Search)

For these example indices, the numeric values are the weights from the eigenvectors and the terminology (X) refers to the values in the generated table for the action or result X. For example, (Mobile Key Download) refers to how many times the action "Mobile Key Download" was performed, (Mobile Key Download Failure) refers to how many times the result "Mobile Key Download Failure" was received, and so forth.

The human technology indices that are generated are thus based on the results of the principal component analysis of the variance-covariance matrix and the corresponding actions or action results. These human technology indices are values that are used in a regression model with a KPI as a target label to find the impact that certain actions or action results have on the KPI.

The human technology index generation module 210 generates these human technology indices for each journey of the user in the collated application usage data 222, and outputs these human technology indices as human technology indices 228 to the KPI prediction module 212. This allows the recommendation system 108 to make recommendations at an individual user level rather than at a multiple user level.

In one or more implementations, one or both of human technology indices 228 and KPI predictions 230 are generated for each of multiple users. This allows the recommendation system 108 to make recommendations for each of the users at an individual user level rather than at a multiple user level.

Additionally or alternatively, multiple users are grouped together based on their human technology indices 228. Any of a variety of techniques are used to group users together, such as K-means clustering based on the users' human technology indices. This would allow, for example, groups of users with similar human technology indices to be treated by the recommendation system 108 equally.

The KPI prediction module 212 implements functionality to generate, based on the human technology indices 228, one or more KPI predictions 230. The KPI predictions 230 are predictions of how one or more actions in the application 124 affect another action (a KPI) in the application 124. For example, what kind of impact does the action of using an in-stay service that is an information search on the application 124 have on a KPI of using the application 124 to make future bookings (e.g., a positive or negative impact, how large or small of an impact, and so forth).

In one or more implementations, the KPI prediction module 212 includes a machine learning system, such as a regression model, to predict whether the one or more actions in the application 124 result in another action in the application 124 (the KPI predictions 230). The regression model is implemented using any of a variety of different public or proprietary techniques. The human technology indices 228 as well as the target label for each journey (which is included in the collated application usage data 222) are used as the input to train the regression model (e.g., a 75:25 train:test split of the human technology indices 228 is used to train the regression model). In one or more implementations the regression model is a binary classifier (e.g., 0 or 1, such as a booking action occurred in the journey or did not occur in the journey). Additionally or alternatively, three or more classes of the target label are specified (e.g., by the manager 140).

The KPI prediction module 212 generates, for each human technology index 228, a KPI prediction 230 for the user. The KPI prediction 230 for a human technology index is thus the impact that the actions or action results used in that index have on the KPI (e.g., the impact that a Mobile Key Download action with a result of Mobile Key Download Failure has on the KPI of booking using the application 124).

The KPI prediction 230 includes various values, such as a coefficient generated by the regression model and optionally a standard error generated by the regression model and a p value from an F-test or a t-test. The KPI prediction 230 for an action is a value indicating the effect that action has on the corresponding KPI.

The recommendation system 108 uses the KPI predictions 230 in a variety of different manners. Continuing with the example above of three human technology indices, assume for a given user two KPI predictions 230 (Mobile Key Download and Mobile Key Unlock) are high but the other KPI prediction 230 (In-Stay Service of information Search) is low. Accordingly, the recommendation system 108 generates recommendations 138 encouraging the manager 140 to remove or discourage use of features from the application 124 related to in-stay services of information search, make features related to in-stay services of information search more user friendly, promote features related to in-stay services of information search (e.g., through messaging), combinations thereof, and so forth. Additionally or alternatively, the recommendation system 108 generates recommendations encouraging the manager 140 to promote usage of mobile key usage to other users 126.

In one or more implementations, the recommendation system 108 uses various different threshold values for the KPI predictions 230 to determine what recommendations 138 to generate and deliver. An example of these threshold values are fixed values (e.g., generate a recommendation 138 encouraging the manager 140 to make features related to in-stay services of information search more user friendly if the KPI prediction has a value of less than 0.2, or generate a recommendation 138 encouraging the manager 140 to promote usage of mobile key usage to other users 126 if the KPI prediction has a value of greater than 0.8). As another example, these threshold values are variable and selected by the manager 140.

In one or more implementations the human technology indices are generated for each user but combined by the human interaction replacement evaluation system 102 or recommendation system 108 for generation of recommendations. For example, if greater than a threshold number of users have a low human technology index, the recommendation system 108 generates recommendations 138 encouraging the manager 140 to remove or discourage use of features from the application 124 related to the action in that human technology index or make features related to the action in that human technology indices more user friendly. By way of another example, if greater than a threshold number of users have a high human technology index, the recommendation system 108 generates recommendations 138 encouraging the manager 140 to add or promote usage of features from the application 124 related to the action in that human technology index.

The output module 214 implements functionality to output the technology adoption readiness indices 226 and the KPI predictions 230. The output module outputs these indices 226 and predictions 230 to, for example, the recommendation system 108.

In some situations the human interaction replacement evaluation system 102 need not include the technology adoption readiness index generation module 208. For example, the human interaction replacement evaluation system 102 generates KPI predictions 230 rather than technology adoption readiness indices 226, in which case the technology adoption readiness index generation module 208 need not be included in the human interaction replacement evaluation system 102.

Similarly, in some situations the human interaction replacement evaluation system 102 need not include the human technology index generation module 210 and the KPI prediction module 212. For example, if the human interaction replacement evaluation system 102 generates technology adoption readiness indices 226 rather than KPI predictions 230, the human technology index generation module 210 and the KPI prediction module 212 need not be included in the human interaction replacement evaluation system 102.

Figure 3:
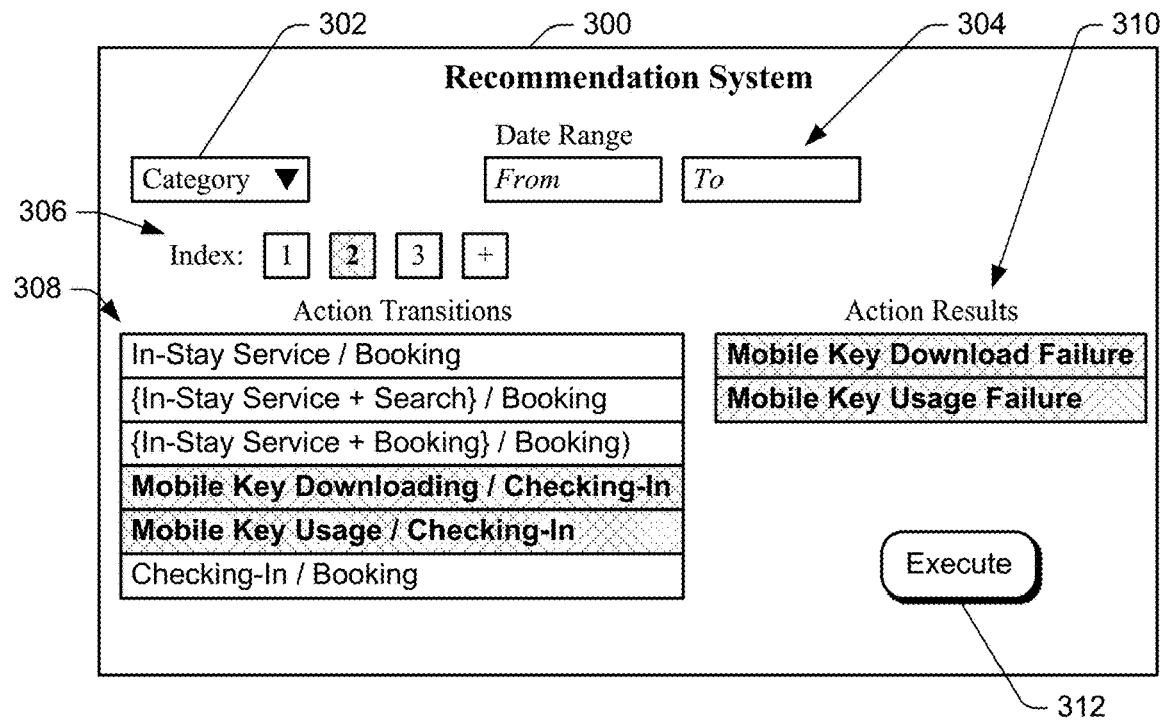
FIG. 3 illustrates an example user interface allowing user selection of action transition probabilities used to generate technology adoption readiness indices.

FIG. 3 illustrates an example user interface 300 allowing user selection of action transition probabilities used to generate technology adoption readiness indices. The user interface 300 is displayed, for example, by the human interaction replacement evaluation system 102 or the client device 106 of FIG. 1. The user interface 300 includes a category selection drop-down menu 302 allowing the manager 140 to select a category of users for which technology adoption readiness indices are to be generated. The user interface 300 also includes date range input fields 304 allowing the manager 140 to select a date range that the application usage data 220 is to be within to be used to generate the technology adoption readiness indices.

The user interface 300 also includes index selection boxes 306. The index selection boxes 306 allow the manager 140 to select which of multiple indices are being defined (e.g., which index the action transitions are being selected for). The currently selected box is illustrated with cross-hatching, so the manager 140 has selected index 2. Three indices are displayed, although additional indices are definable by selection of the box with the "+" sign.

The user interface 300 also includes action transition selection boxes 308. The user selects any of multiple different action transitions to include in the index. The currently selected action transitions are illustrated with cross-hatching so Mobile Key Downloading/Checking-In and Mobile Key Usage/Checking-In are currently selected. The user interface 300 also includes action result selection boxes 310. The user selects any of multiple different action results to include in the index. The currently selected action results are illustrated with cross-hatching, so Mobile Key Download Failure and Mobil Key Usage Failure are currently selected.

The user interface 300 also includes an Execute button 312. The manager 140 selects the Execute button 312 to have the defined technology adoption readiness indices generated. In one or more implementations, in response to selection of the Execute button 312 the human interaction replacement evaluation system 102 generates each technology adoption readiness index defined by the manager 140 via the user interface 300.

Figure 4:
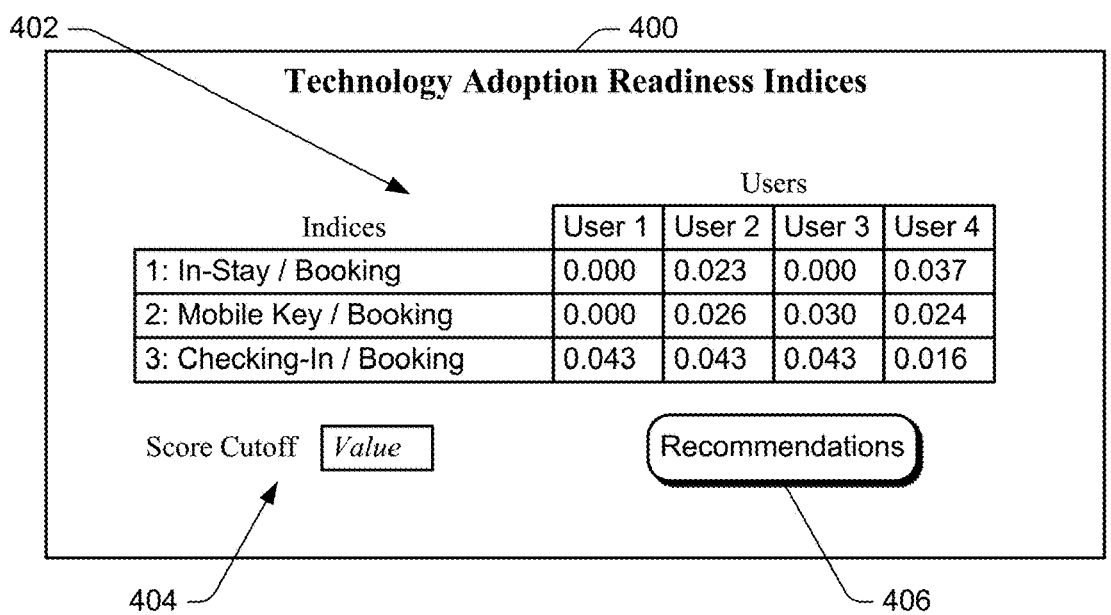
FIG. 4 illustrates an example user interface displaying technology adoption readiness indices.

FIG. 4 illustrates an example user interface 400 displaying technology adoption readiness indices. The user interface 400 is displayed, for example, by the human interaction replacement evaluation system 102 or the client device 106 of FIG. 1. The user interface 400 includes a table 402 that lists the generated technology adoption readiness indices scores for each of multiple users.

The user interface 400 optionally includes a score cutoff input field 404 allowing the manager 140 to input a cutoff value for sending recommendations. For example, situations in which the manager 140 desires to have recommendations sent to users for any indices having scores of 0.030 or higher. As illustrated, the technology adoption readiness indices scores are provided for individual users.

The user interface 400 also includes a Recommendations button 406. The manager 140 selects the Recommendations button 406 to have recommendations delivered to users based on the technology adoption readiness indices scores. This delivery is, for example, delivery to a user of recommendations corresponding to the technology adoption readiness indices for which the user has a score that satisfies the cutoff value. For example, the recommendation system 102 sends a recommendation encouraging User 4 to use additional features of the application 124 that are related to in-stay actions that replace human interaction services (due to the score of 0.037 being considered high), but not to User 1, User 2, or User 3 (due to the scores of 0.000 and 0.023 not being considered high).

Figure 5:
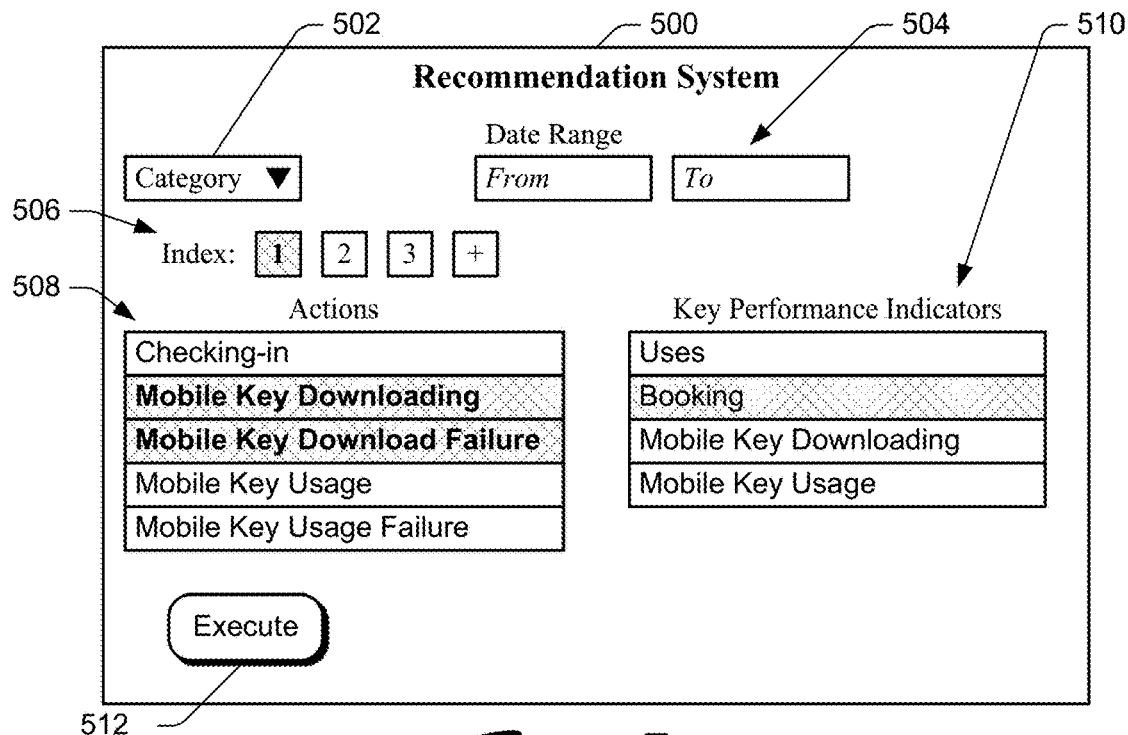
FIG. 5 illustrates an example user interface allowing user selection of KPIs as well as actions or action results used to generate KPI predictions.

FIG. 5 illustrates an example user interface 500 allowing user selection of KPIs as well as actions or action results used to generate KPI predictions. The user interface 500 is displayed, for example, by the human interaction replacement evaluation system 102 or the client device 106 of FIG. 1. The user interface 500 includes a category selection drop-down menu 502 allowing the manager 140 to select a category of users for which KPI predictions are to be generated. The user interface 500 also includes date range input fields 504 allowing the manager 140 to select a date range that the application usage data 220 is to be within to be used to generate the KPI predictions.

The user interface 500 also includes index selection boxes 506. The index selection boxes 506 allow the manager 140 to select which of multiple indices are being defined (e.g., which index the KPI as well as actions or action results are being selected for). The currently selected box is illustrated with cross-hatching, so the manager 140 has selected index 1. Three indices are displayed, although additional indices are definable by selection of the box with the "+" sign.

The user interface 500 also includes action selection boxes 508. The user selects any of multiple different actions or action results to include in the KPI prediction. The currently selected actions or action results are illustrated with cross-hatching so the Mobile Key Downloading action and Mobile Key Downloading Failure result are currently selected. The user interface 500 also includes KPI selection boxes 510. The user selects any of multiple different KPIs for which the KPI prediction is to be generated. The currently selected KPI prediction is illustrated with cross-hatching, so Booking is currently selected.

The user interface 500 also includes an Execute button 512. The manager 140 selects the Execute button 512 to have the defined KPI predictions generated. In one or more implementations, in response to selection of the Execute button 512 the human interaction replacement evaluation system 102 generates the KPI prediction defined by the manager 140 via the user interface 500.

Figure 6:
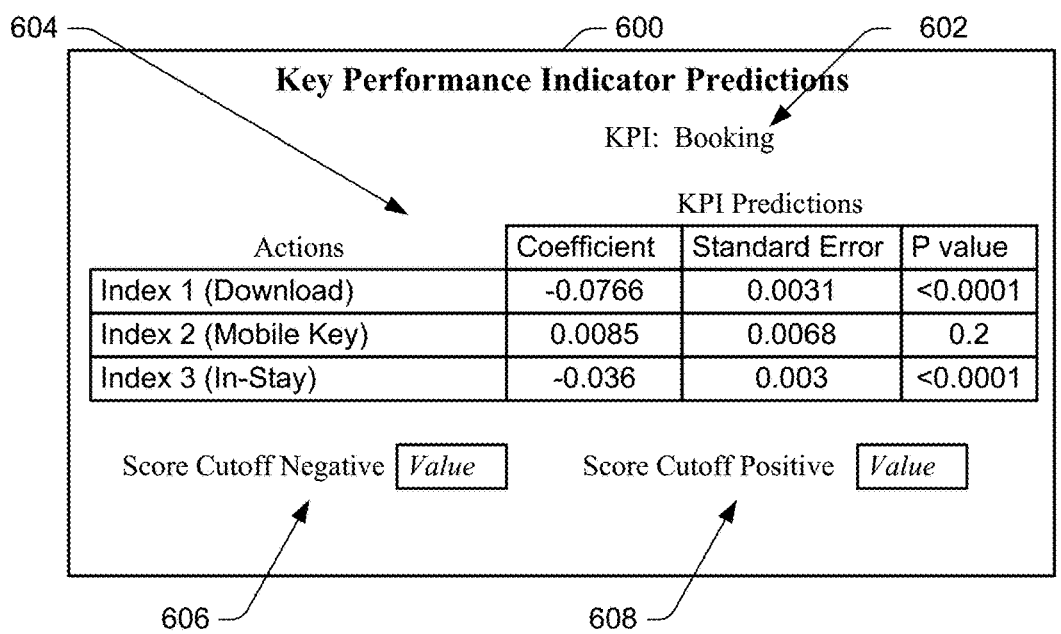
FIG. 6 illustrates an example user interface displaying KPI predictions.

FIG. 6 illustrates an example user interface 600 displaying KPI predictions. The user interface 600 is displayed, for example, by the human interaction replacement evaluation system 102 or the client device 106 of FIG. 1. The user interface 600 includes a KPI 602 that identifies the KPI for which the KPI predictions were generated. The user interface 600 also includes a table 604 that lists the KPI predictions for each of multiple actions.

The user interface 600 optionally includes score cutoff input fields 606 and 608. The score cutoff negative input field 606 allows the manager 140 to input a lower cutoff value for identifying actions affecting the KPI. Any action having a coefficient in the table 604 less than the lower cutoff value is called out in the table 604 as having a negative effect on the KPI, such as by being highlighted, by shadowing or deleting actions that are not less than the lower cutoff value, and so forth.

Similarly, the score cutoff positive input field 608 allows the manager 140 to input an upper cutoff value for identifying actions affecting the KPI. Any action having a coefficient in the table 604 greater than the upper cutoff value is called out in the table 604 as having a positive effect on the KPI, such as by being highlighted, by shadowing or deleting actions that are not greater than the upper cutoff value, and so forth.

Example Procedures

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made to FIGS. 1-6.

Figure 7:
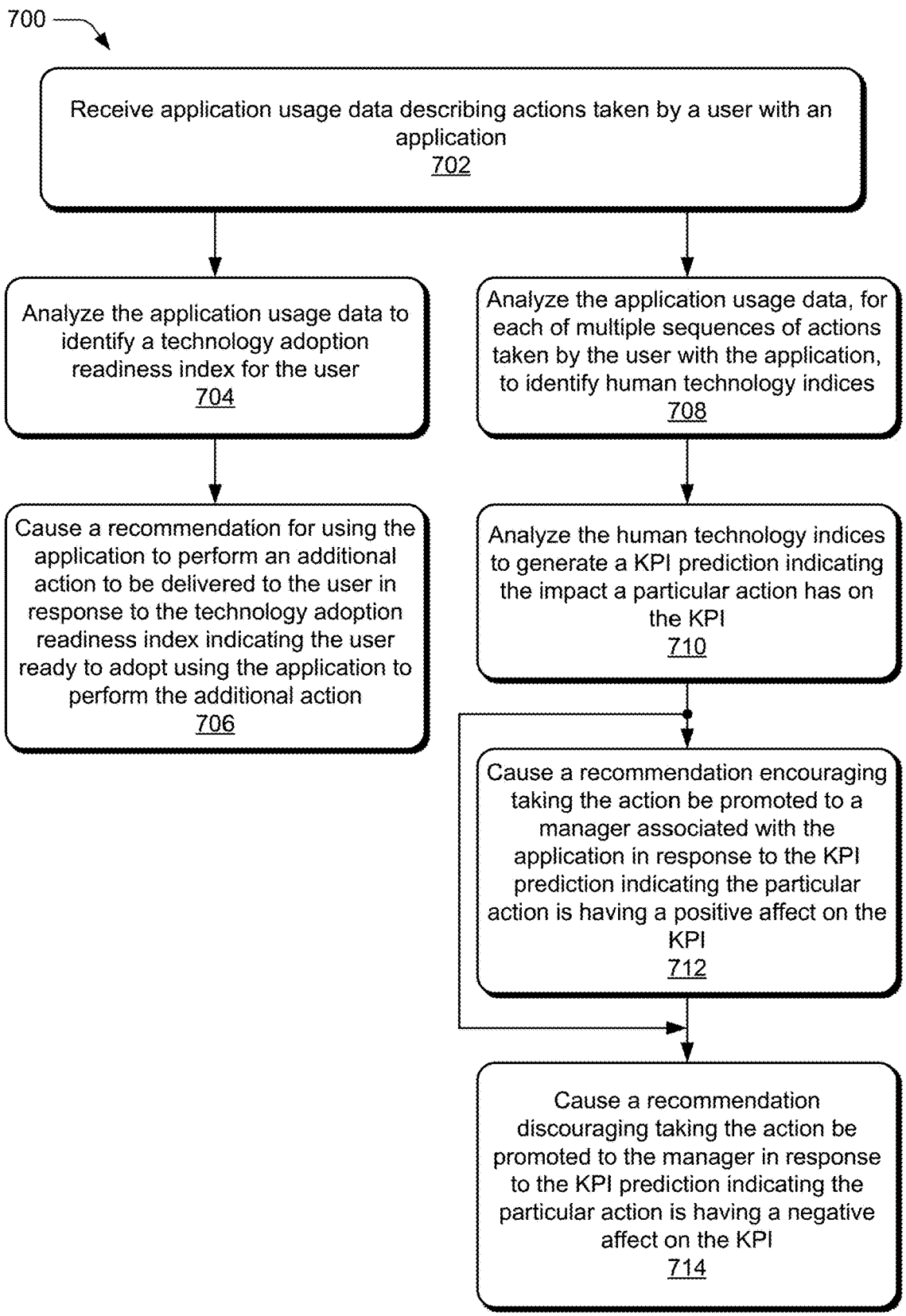
FIG. 7 is a flow diagram depicting a procedure in an example implementation of recommender system based on trendsetter inference.

FIG. 7 is a flow diagram depicting a procedure in an example 700 implementation of recommender system based on trendsetter inference. In this example, application usage data describing actions taken by a user with an application is received (block 702). This application usage data describes multiple sequences of actions taken by the user with the application.

The application usage data is analyzed to identify a technology adoption readiness index for the user (block 704). The technology adoption readiness index indicates how likely the user is to be ready to adopt using the application to perform an additional action.

A recommendation for using the application to perform the additional action is caused to be delivered to the user in response to the technology adoption readiness index indicating the user is ready to adopt using the application to perform the additional action (block 706). This recommendation is delivered, for example, by a recommendation system in a variety of different manners.

The application usage data is also analyzed, for each of multiple sequences of actions taken by the user with the application, to identify human technology indices (block 708). The human technology indices are values assigned to various actions taken by users when using an application.

The human technology indices are analyzed to generate a KPI prediction indicating the impact a particular action has on the KPI (block 710). Examples of this impact include positive, negative, or neutral.

A recommendation encouraging taking the action is caused to be promoted to a manger associated with the application in response to the KPI prediction indicating that the particular action is having a positive effect on the KPI (block 712). This recommendation is delivered, for example, by a recommendation system in a variety of different manners. Block 712 is optional and need not be performed if the KPI predication does not indicate that the particular action is having a positive effect on the KPI.

A recommendation discouraging taking the action is caused to be promoted to the manager associated with the application in response to the KPI prediction indicating that the particular action is having a negative effect on the KPI (block 714). This recommendation is delivered, for example, by a recommendation system in a variety of different manners. Block 714 is optional and need not be performed if the KPI predication does not indicate that the particular action is having a negative effect on the KPI.

As illustrated, there are two operation flows in the example 700. One operation flow is blocks 702, 704, and 706. The other operation flow is blocks 702, 708, 710, and 712 or 714. A human interaction replacement evaluation system implements one or both of these operation flows. E.g., the two operation flows are performed concurrently or consecutively, or only one of the operation flows is performed.

Example System and Device

Figure 8:
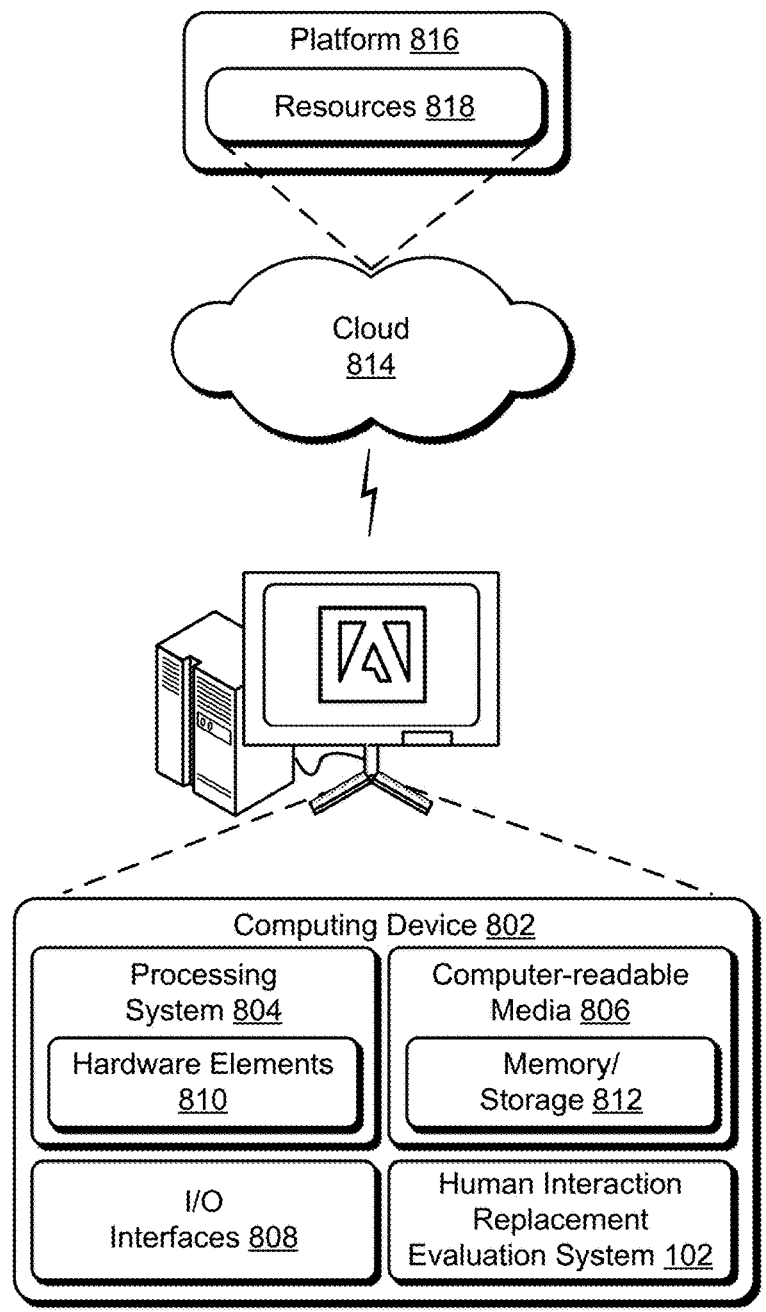
FIG. 8 illustrates an example system including various components of an example device that is implemented as any type of computing device as described and/or utilize with reference to FIGS. 1-7 to implement aspects of the techniques described herein.

FIG. 8 illustrates an example system generally at 800 that includes an example computing device 802 that is representative of one or more computing systems and/or devices that implement the various techniques described herein. This is illustrated through inclusion of the human interaction replacement evaluation system 102. The computing device 802 is, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, in one or more implementations the computing device 802 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that are configured, for example, as processors, functional blocks, and so forth. The processing system 804 is optionally implemented in hardware as an application specific integrated circuit or other logic device formed using one or more semiconductors. The hardware elements 810 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 806 is illustrated as including memory/storage 812. The memory/storage 812 represents memory/storage capacity associated with one or more computer-readable media. The memory/storage component 812 includes one or both of volatile media (such as random access memory (RAM)) and nonvolatile media (such as read only memory (ROM), Flash memory, optical disks, magnetic disks, and so forth). The memory/storage component 812 includes one or both of fixed media (e.g., RAM, ROM, a fixed hard drive, and so on) and removable media (e.g., Flash memory, a removable hard drive, an optical disc, and so forth). The computer-readable media 806 is optionally configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implemented on one or more of a variety of commercial computing platforms having a variety of processors.

An implementation of the described modules and techniques is optionally stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some implementations to implement at least some aspects of the techniques described herein, such as to perform one or more instructions. Hardware includes one or more of components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. Additionally or alternatively, this functionality is implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that are utilized while computer processing is executed on servers that are remote from the computing device 802. Resources 818 also include services provided over the Internet and/or through a subscriber network, such as a cellular or Wi-Fi network.

The platform 816 abstracts resources and functions to connect the computing device 802 with other computing devices. The platform 816 also optionally serves to abstract scaling of resources to provide a corresponding level of scale to encountered demand for the resources 818 that are implemented via the platform 816. Accordingly, in an interconnected device embodiment, implementation of functionality described herein are distributed throughout the system 800. For example, the functionality is implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to cause a recommendation to be delivered to a client device, a method implemented by at least one computing device, the method comprising:
   receiving, by an application usage data organization module of the at least one computing device and from storage of the at least one computing device, application usage data describing actions taken by a user with an application;
   generating, by a technology adoption readiness index generation module of the at least one computing device and based on a machine learning system trained on the application usage data to identify a probability of the user transitioning from performing one action using the application to performing another action using the application, technology adoption readiness index that identifies an initial action previously taken by the user with the application and one or more further actions previously taken by the user with the application as a result of the user taking the initial action with the application, the one or more further actions being of a same category of actions that are taken with the application, the technology adoption readiness index indicating how likely the user is to be ready to adopt using the application to perform an additional action within the category of actions; and
   delivering, by a recommendation system of the at least one computing device in response to the technology adoption readiness index indicating the user is ready to adopt using the application to perform the additional action within the category of actions, a recommendation for using the application to perform the additional action over a network to a client device associated with the user.

2. The method of claim 1, the generating including generating multiple action transition probabilities for the user based on the machine learning system, each action transition probability indicating a probability of the user transitioning from performing one action using the application to performing another action using the application, and using the multiple action transition probabilities to generate the technology adoption readiness index.

3. The method of claim 2, the user being one of multiple users of the application, the machine learning system being trained on a portion of the application usage data describing actions taken by the user but not by others of the multiple users.

4. The method of claim 2, the generating further including:
   generating a matrix for selected action transition probabilities, the matrix including a first axis identifying initial actions, a second axis identifying subsequent actions, and cells including the action transition probabilities of the user transitioning from the initial actions to the subsequent actions;
   performing eigen decomposition on the matrix to generate multiple eigenvalues and multiple eigenvectors; and
   generating, as the technology adoption readiness index, a weighted sum of ones of the action transition probabilities, the ones of the action transition probabilities being weighted by values in ones of the multiple eigenvectors.

5. The method of claim 4, the generating further including receiving an indication of the selected transition probabilities from a manager other than the user.

6. The method of claim 4, the generating the weighted sum including selecting, as the ones of the eigenvectors, a set of the eigenvectors corresponding to largest eigenvalues.

7. The method of claim 1, further comprising repeating the generating and delivering for each of multiple additional users.

8. The method of claim 1, further comprising:
analyzing, by a human technology index generation model of the at least one computing device, the application usage data to identify, for each of multiple sequences of actions taken by the user with the application, human technology indices indicative of a frequency with which an action was taken by the user with the application and a frequency with which an action result was received, the action result indicating a success or a failure of the action taken;
generating, by a key performance indicator prediction module of the at least one computing device and based on an additional machine learning system trained on the human technology indices to predict whether performance of one action using the application leads to performance of another action using the application, a key performance indicator prediction indicating whether performance of the action taken with the application together with the action result positively or negatively impacts whether a different action taken with the application will also be performed, the different action being identified by a key performance indicator; and
delivering, by the recommendation system in response to the key performance indicator prediction indicating that performance of the action together with the action result positively impacts the different action identified by the key performance indicator also being performed, a recommendation encouraging taking the action over the network to an additional client device associated with a manager of the application.

9. A system comprising:
an application usage data organization module implemented at least partially in hardware of at least one computing device and configured to receive, from storage of the at least one computing device, application usage data describing multiple sequences of actions taken by a user with an application;
a human technology index generation model implemented at least partially in hardware of the at least one computing device and configured to analyze the application usage data to identify, for each of the multiple sequences of actions, human technology indices which indicate a frequency with which an action was taken by the user with the application and a frequency with which an action result was received, the action result indicating a success or a failure of the action taken by the user;
a key performance indicator prediction module implemented at least partially in hardware of the at least one computing device and configured to generate, based on a machine learning system trained on the human technology indices to predict whether performance of one action using the application leads to performance of another action using the application, a key performance indicator prediction indicating whether performance of the action taken with the application together with the action result positively or negatively impacts whether a different action taken with the application will also be performed, the different action being identified by a key performance indicator; and
a recommendation system implemented at least partially, in hardware of the at least one computing device and configured to, in response to the key performance indicator prediction indicating that performance of the action together with the action result positively impacts the different action identified by the key performance indicator also being performed, deliver a recommendation encouraging taking the action over a network to a client device associated with a manager of the application.

10. The system of claim 9, the recommendation system being further configured to, in response to the key performance indicator prediction indicating that performance of the action together with the action result negatively impacts the different action identified by the key performance indicator also being performed, deliver a recommendation discouraging taking the action over the network to the client device.

11. The system of claim 9, the user being one of multiple users of the application, the human technology index generation model configured to analyze a portion of the application usage data describing actions taken by the user but not by others of the multiple users.

12. The system of claim 9, wherein the human technology index generation model is further configured to:
generate a matrix for selected actions, the matrix including a first axis identifying the sequences of actions or action results, a second axis identifying the actions or action results, and cells including values, for each sequence of actions, indicating how many times the actions were performed or how many times the action results were received;
perform eigen decomposition on the matrix to generate multiple eigenvalues and multiple eigenvectors; and
generate, as the human technology index for a sequence of actions, a weighted sum of ones of the values indicating how many times the actions were performed or how many times the action results were received, the ones of the values being weighted by values in ones of the multiple eigenvectors.

13. The system of claim 12, wherein the human technology index generation model is further configured to receive an indication of the selected actions from the manager associated with the application.

14. The system of claim 12, to generate the weighted sum, the human technology index generation model is further configured to select, as the ones of the eigenvectors, a set of the eigenvectors corresponding to largest eigenvalues.

15. The system of claim 9, further comprising:
a technology adoption readiness index generation module implemented at least partially in hardware of the at least one computing device and configured to generate, based on an additional machine learning system trained on the application usage data to identify a probability of the user transitioning from performing one action using the application to performing another action using the application, a technology adoption readiness index that identifies an initial action previously taken by the user with the application and one or more further actions previously taken by the user with the application as a result of the user taking the initial action with the application, the one or more further actions being of a same category of actions that are taken with the application, the technology adoption readiness index indicating how likely the user is to be ready to adopt using the application to perform an additional action within the category of actions; and the recommendation system being further configured to deliver, in response to the technology adoption readiness index indicating the user is ready to adopt using the application to perform the additional action within the category of actions, a recommendation for using the application to perform the additional action over the network to an additional client device associated with the user.

16. A system comprising:

an application usage data organization module implemented at least partially in hardware of at least one computing device and configured to receive, from storage of the at least one computing device, application usage data describing multiple sequences of actions taken by a user with an application;

means for generating, from the application usage data and for each of the multiple sequences of actions, a key performance indicator prediction indicating whether performance of an action taken by the user with the application together with an action result positively or negatively impacts whether a different action taken with the application and identified by a key performance indicator will also be performed, the action result indicating a success or a failure of the action taken;

means for generating, based on a machine learning system trained on the application usage data to identify a probability of the user transitioning from performing one action using the application to performing another action using the application, a technology adoption readiness index that identifies an initial action previously taken by the user with the application and one or more further actions previously taken by the user with the application as a result of the user taking the initial action with the application, the one or more further actions being of a same category of actions that are taken with the application, the technology adoption readiness index indicating how likely the user is to be ready to adopt using the application to perform an additional action within the category of actions; and a recommendation system implemented at least partially in hardware of the at least one computing device and configured to, in response to the key performance indicator prediction indicating that performance of the action together with the action result positively impacts the different action identified by the key performance indicator also being performed, deliver a recommendation encouraging taking the action over a network to a client device associated with a manager of the application, and further configured to deliver, in response to the technology adoption readiness index indicating the user is ready to adopt using the application to perform the additional action within the category of actions, a recommendation for using the application to perform the additional action over the network to an additional client device associated with the user.

17. The system of claim 16, the recommendation system being further configured to, in response to the key performance indicator prediction indicating performance of the action together with the action result negatively impacts the different action identified by the key performance indicator also being performed, deliver a recommendation discouraging taking the action over a network to the client device associated with the manager.

18. The system of claim 16, the means for generating the technology adoption readiness index including means for generating multiple action transition probabilities for the user based on the machine learning system, each action transition probability indicating a probability of the user transitioning from performing one action using the application to performing another action using the application, and using the multiple action transition probabilities to generate the technology adoption readiness index.

19. The method of claim 2, wherein each action transition probability indicates a probability of the user transitioning from performing an initial action using the application to performing a subsequent action using the application, the subsequent action being performable by the user only in response to the user performing the initial action.

20. The method of claim 2, wherein the multiple action transition probabilities are generated by the machine learning system trained to identify the probability of the user transitioning from performing one action using the application to performing another action using the application by:

receiving the application usage data describing sequences of actions taken by the user with the application;

predicting, for the actions included in each of the sequences of actions, a next action to be performed by the user; and adjusting weights in the machine learning system to minimize a loss function based on whether the predicted next action corresponds to the next action that was performed by the user, as indicated by the application usage data.

\* \* \* \* \*